(12) United States Patent
Maniktala

(10) Patent No.: US 8,839,008 B2
(45) Date of Patent: Sep. 16, 2014

(54) SYSTEM AND METHOD FOR DETECTING CONFIGURATION OF A POWER SOURCING EQUIPMENT DEVICE CONNECTED TO A POWERED DEVICE BY SIMULTANEOUSLY MEASURING VOLTAGE AT TWO TERMINALS OF A RESISTOR DISPOSED WITHIN THE POWERED DEVICE

(75) Inventor: Sanjaya Maniktala, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 314 days.

(21) Appl. No.: 13/244,014

(22) Filed: Sep. 23, 2011

(65) Prior Publication Data

US 2013/0076146 A1 Mar. 28, 2013

(51) Int. Cl.
*G06F 1/00* (2006.01)
*H02J 4/00* (2006.01)
*H02M 7/02* (2006.01)
*H02J 1/00* (2006.01)

(52) U.S. Cl.
CPC ........................................ *H02J 1/00* (2013.01)
USPC ................................ 713/300; 307/80; 363/67

(58) Field of Classification Search
CPC ............. H02M 7/08; H02M 7/10; H02J 1/10; H02J 1/102; H02J 9/061; G06F 1/26
See application file for complete search history.

(56) References Cited

U.S. PATENT DOCUMENTS

| | | | | |
|---|---|---|---|---|
| 8,132,027 B2 * | 3/2012 | Blaha et al. | ................... | 713/300 |
| 2007/0170909 A1 * | 7/2007 | Vorenkamp et al. | ........ | 324/76.11 |
| 2009/0100274 A1 * | 4/2009 | Diab et al. | ..................... | 713/300 |
| 2010/0237846 A1 * | 9/2010 | Vetteth | .......................... | 323/305 |
| 2013/0093444 A1 * | 4/2013 | Maniktala et al. | ............ | 324/713 |

\* cited by examiner

*Primary Examiner* — Thomas Lee
*Assistant Examiner* — Zhipeng Wang
(74) *Attorney, Agent, or Firm* — Oblon, Spivak, McClelland, Maier & Neustadt, L.L.P.

(57) ABSTRACT

Provided is a method for detecting a PoE (power over Ethernet) device comprising applying a positive polarity of a first current source to one of a first and second data pairs of an Ethernet connection to a powered device (PD) and a negative polarity of the first current source to the other of the first and second data pairs, applying a positive polarity of a second current source to a first spare pair of the Ethernet connection and a negative polarity of the first current source to a second spare pair of the Ethernet connection, simultaneously measuring a first voltage across the first current source and a second voltage across the second current source, discontinuing application of the first current source and measuring a third voltage across the second current source, and determining a configuration of the PD using the measured first, second and third voltages.

19 Claims, 10 Drawing Sheets

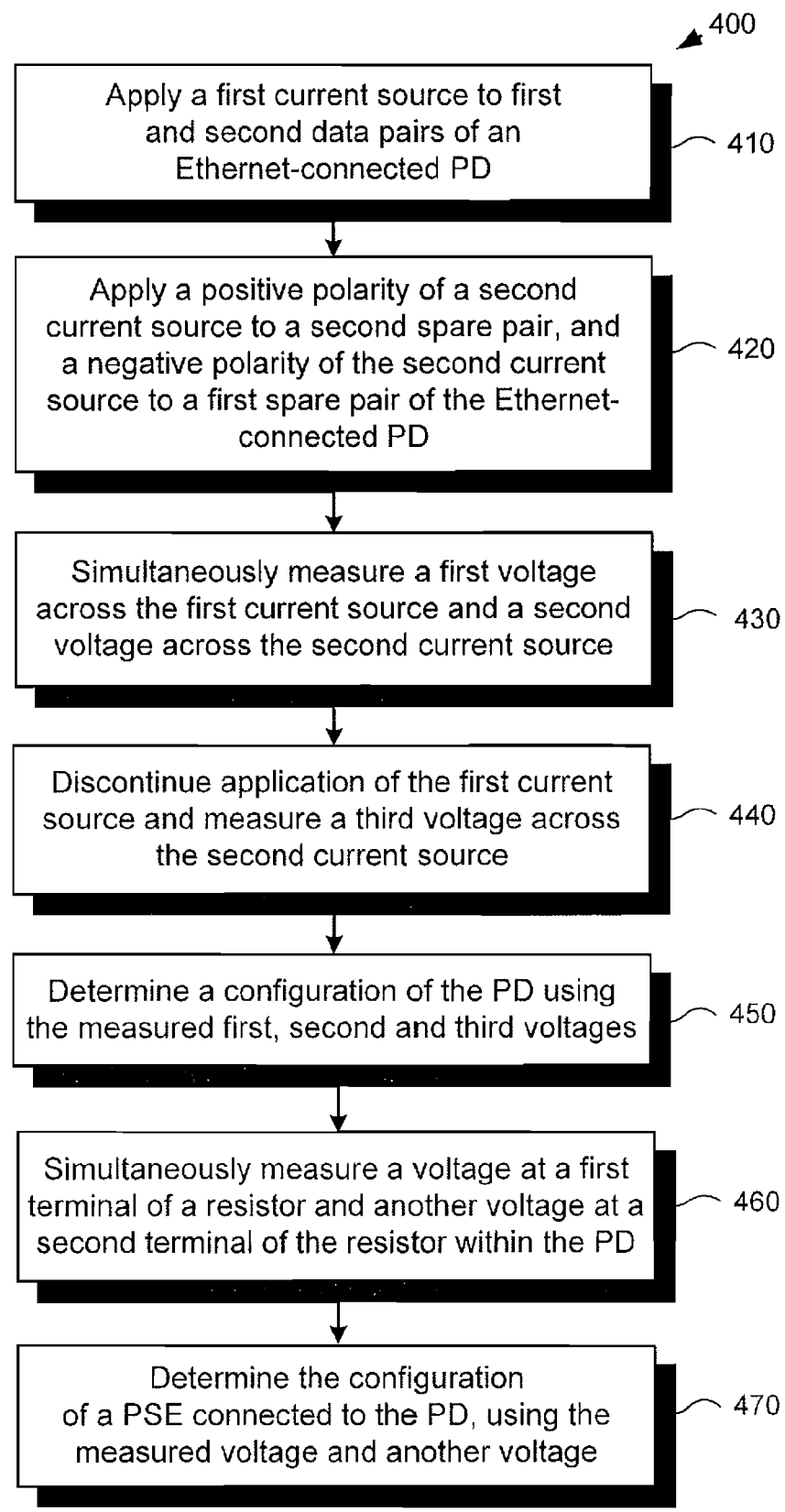

SYSTEM AND METHOD FOR DETECTING CONFIGURATION OF A POWER SOURCING EQUIPMENT DEVICE CONNECTED TO A POWERED DEVICE BY SIMULTANEOUSLY MEASURING VOLTAGE AT TWO TERMINALS OF A RESISTOR DISPOSED WITHIN THE POWERED DEVICE

BACKGROUND OF THE INVENTION

1. Field of the Invention

The present invention relates generally to detection protocols. More particularly, the present invention relates to detection protocols for detecting a configuration of a device connected via Ethernet connection.

2. Background Art

Power over Ethernet (also known as PoE) is a technology that allows electronic devices such as IP telephones, wireless LAN Access Points, Security network cameras and other IP-based terminals to receive power, in parallel to data, usually over an existing CAT-5 or similar Ethernet infrastructure without the need to make modifications to the infrastructure. PoE integrates data and power on the same wires and does not interfere with concurrent network operation. However implementation of PoE solutions involves numerous challenges. First and foremost, the solution must closely comply with communication and safety standards.

As PoE technology continues to advance, there is an increasing need to ensure newer technologies and protocols used within PoE devices remain compatible with conventional configurations while also offering the ability to detect when a connected device is compatible with these newer technologies and protocols, providing for a safe activation of such new communication and/or power features between connected, mutually compatible devices. This detectability should be, preferably, on the physical layer of emerging devices such that conventional power up and communication between connected devices is not required to identify a device as being compatible with a new set of protocols or features. However, because detection is required on the physical layer, devices which implement new technologies require a physical difference in the circuitry and an associated method of detection such that detection on the physical layer is possible when a detection power pulse is applied to such a device.

In a conventional PoE arrangement a power sourcing equipment device (PSE) is connected to a powered device (PD) via an Ethernet cable. FIG. 1b shows a typical Ethernet cable 130, also known as a medium-dependent interface (MDI or RJ-45), as commonly used in PoE applications. The Ethernet cable 130 serves as the data/power interface between Ethernet elements, for example between a PSE and a PD. Ethernet cable 130 includes 8 conductors arranged into 4 pairs. Conductor 1 and 2 comprise a first data pair 132, conductors 3 and 6 comprise a second data pair 134, conductors 4 and 5 comprise a first spare pair 136 and conductors 7 and 8 comprise a second spare pair 138. Each Ethernet cable 130 includes a modular connector 140 at each terminating end, thus allowing universal connection between any PSE and PD designed for use in a PoE application. Under IEEE 802.3at standard a PSE has two optional connection methods to deliver power from a PSE to a connected PD, Alternative A & B. Table 1 details the two power feeding alternatives.

TABLE 1

PSE Pinout alternatives

| Conductor | Alternative A (MDI-X) | Alternative A (MDI) | Alternative B (All) |
|---|---|---|---|
| 1 | Negative $V_{PSE}$ | Positive $V_{PSE}$ | |
| 2 | Negative $V_{PSE}$ | Positive $V_{PSE}$ | |
| 3 | Positive $V_{PSE}$ | Negative $V_{PSE}$ | |
| 4 | | | Positive $V_{PSE}$ |
| 5 | | | Positive $V_{PSE}$ |
| 6 | Positive $V_{PSE}$ | Negative $V_{PSE}$ | |
| 7 | | | Negative $V_{PSE}$ |
| 8 | | | Negative $V_{PSE}$ |

According to IEEE 802.3at standard, "Alternative A" allows power to be supplied to a PD via first and second data pairs 132,134 only, in either polarity. For example, a positive polarity applied to conductors 1, 2 of first data pair 132 and a negative polarity applied to conductors 3, 6 of second data pair 134, is "Alternative A (MDI)". Where this same connection is made, but with polarities reversed, "Alternative A (MDI-X)" is utilized. IEEE 802.3at standard alternatively allow power to be supplied via first and second spare pairs 136,138, but in just one polarity. "Alternative B" requires that a positive polarity be applied to conductors 4, 5 of first spare pair 136 and a negative polarity be applied to conductors 7, 8 of second spare pair 138. Thus, the IEEE 802.3at standard prohibits a compliant PSE from applying power to all 4 pairs simultaneously and a compliant PD from receiving power from all 4 pairs simultaneously. Under the IEEE 802.3af standard, each conductor pair is rated to carry a maximum of approximately 15 watts. Under the IEEE 802.3at standard, each conductor pair is rated to carry a maximum of approximately 30 watts. Thus, a device which utilizes Alternative A or B, as disclosed above, to either provide or receive power may be commonly called a 2-pair or 30 watt device.

Thus, an IEEE 802.3at compliant PSE can provide power to a connected PD via first and second data pairs 132,134 in either polarity, or via first and second spare pairs 136,138 with positive polarity applied only to first spare pair 136 comprising conductors 4, 5.

Though not strictly within the ambit of the IEEE standard, there are also some devices in which power is applied via all 4 pairs, 30 W each and up to 60 W combined, but in which the rest of the IEEE standard is maintained in spirit. Thus, these 4-pair PSE devices will apply power on all 4 pairs according to Alternative A, both possibilities of either polarity, combined with power according to Alternative B or single polarity, thus utilizing all 4 pairs of the Ethernet cable. However, in accordance with the IEEE standard, in such 4-pair cases, to keep to the underlying spirit of IEEE802.3at and also for maintaining backwards compatibility, power is usually never applied in the reverse polarity of Alternative B.

FIG. 2 discloses a system 200 including a conventional PD 220. To be compatible with both Alternative A power arrangements, first and second data pairs 132,134, comprising conductors 1, 2 and 3, 6 respectively, are input to first and second input terminals of a first full-wave rectifier 222. Although not expressly required according to IEEE standards, all known or practical commercial PDs, for example PD 220, also input first and second spare pairs 136,138, comprising conductors 4, 5 and 7, 8 respectively, into a second full-wave rectifier 224. A standard IEEE signature resistor R1 having a resistance of, for example, 25 kΩ is then connected across the outputs of first and second full-wave rectifiers 222,224 such that a first terminal of resistor R1 is connected across the rectified positive rails of both first and second full-wave rectifiers 222, 224 and a second terminal of resistor R1 is connected across the rectified negative rails of both first and second full-wave rectifiers 222,224. Thus, if a reverse polarity of the Alternative B connection scheme is applied to conventional PD 220 at the spare pair inputs 136,138 such that the negative polarity is applied to second spare pair 138, comprising conductors 4, 5, the voltage across and current through signature resistor R1 of conventional PD 220 is the same as with Alternative B. Thus, conventional PD 220 cannot distinguish, on the physical layer, between a PSE which applies an IEEE compliant, Alternative B polarity power from a PSE which applies a reverse Alternative B polarity, the significance of which will become apparent when describing the present invention.

Moreover, because currents passing through first and second full-wave recitifiers 222,224 will always pass through signature resistor R1, and will pass through in the same direction, a PSE applying a detection power pulse will not be able to distinguish between different PDs, on the physical layer, based solely on application of detection voltage pulses, having particular polarities, to data pairs 132,134 and spare pairs 136,138, the significance of which will also become apparent when describing the present invention. Thus, conventional applications of PoE do not allow for the mutual detection of emerging devices having added functional capabilities, on the physical layer, such that conventional power up and communication between connected devices is not required to identify a device as being compatible with a new set of protocols or features.

Accordingly, there is a need to overcome the drawbacks and deficiencies in the art by providing a physical design and associated detection protocol that is relatively inexpensive and simple to implement but that allows backwards compatibility with older PoE devices while also offering detection of a connected device capable of utilizing these new features or protocols on the physical layer without having to blindly power up, and communicate with, the connected device to make such a determination.

SUMMARY OF THE INVENTION

The present application is directed to systems and methods for detecting powered and/or powering device configuration via Ethernet connection, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 presents a flowchart illustrating a method implementing a detection protocol for detecting a configuration of a device connected via Ethernet connection, according to one embodiment of the present invention;

DETAILED DESCRIPTION OF THE INVENTION

Figure 1A:
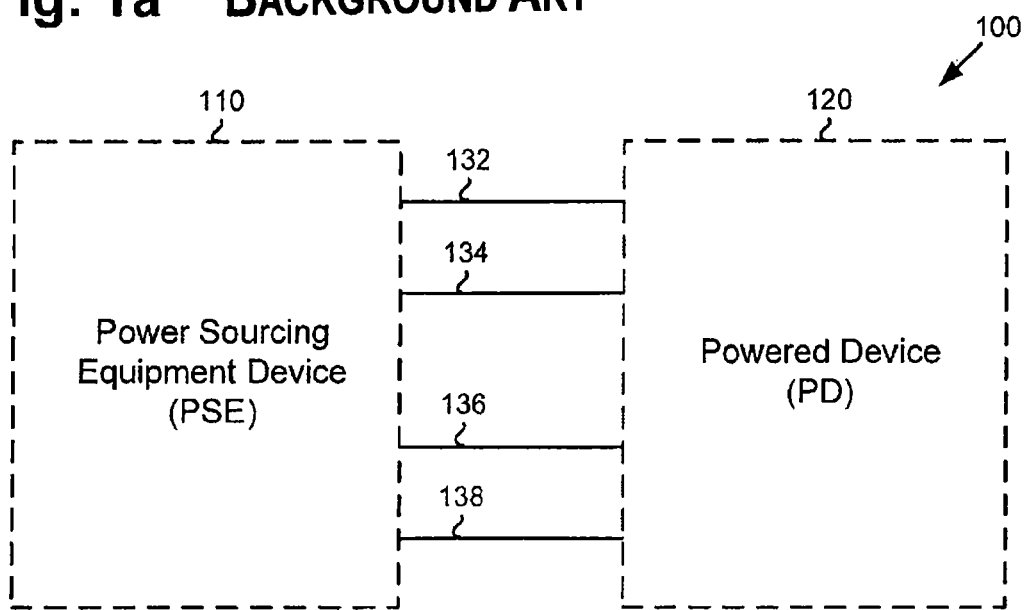
FIG. 1a presents a diagram of a system implementing a detection protocol for detecting a configuration of a device connected via Ethernet connection, according to one embodiment of the present invention.
Figure 1B:
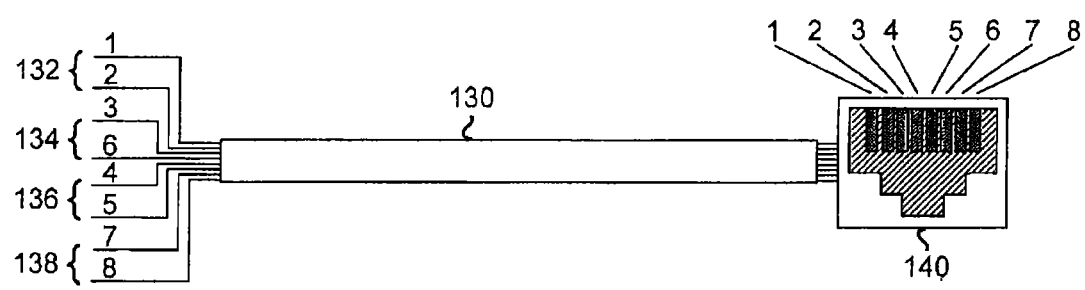
FIG. 1b presents a diagram of an Ethernet cable connection as used by a system implementing a detection protocol for detecting a configuration of a device connected via Ethernet connection, according to one embodiment of the present invention.

The present application is directed to a system, and associated method, employing a detection protocol for detecting a configuration of a device connected via Ethernet connection. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1a shows a System 100 implementing a detection protocol for detecting a configuration of a device connected via Ethernet connection, according to one embodiment of the present invention. As shown in FIG. 1a, System 100 includes power sourcing equipment device (PSE) 110 and powered device (PD) 120 connected to one another by way of, for example, an Ethernet cable connection 130 which includes first and second data pairs 132 and 134, respectively, and first and second spare pairs 136 and 138, respectively. In operation, PSE 110 may be configured to utilize first and second data pairs 132,134 and first and second spare pairs 136,138 to power PD 120 which may be, by way of example, an IP telephone, wireless LAN Access Point, Security network camera or other IP-based terminal.

Figure 3A:
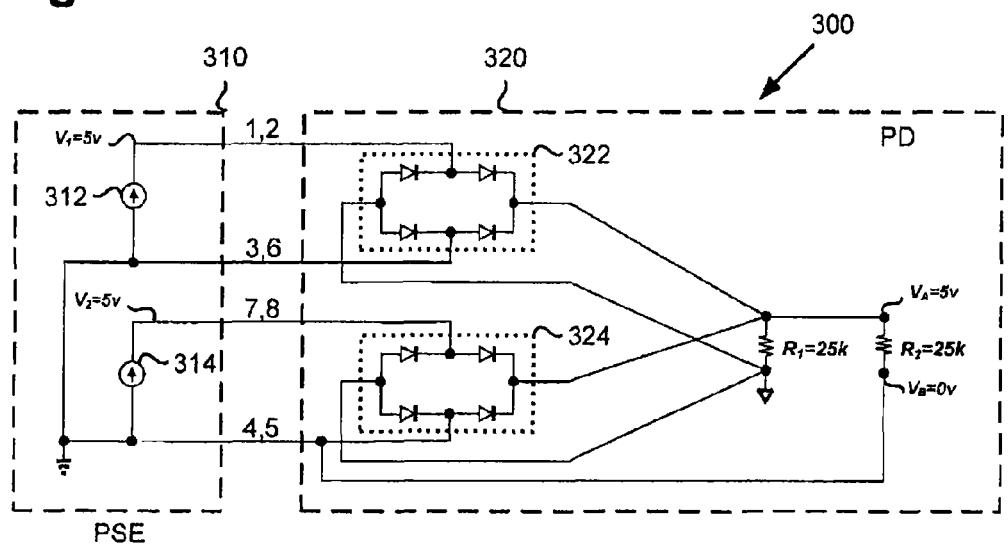
FIGS. 3a-3b present circuit diagrams of a system including a novel PSE and a novel PD implementing a detection protocol for detecting a configuration of a device connected via Ethernet connection, according to one embodiment of the present invention

The present invention will now be discussed with reference to FIGS. 3a, 3b and 4. Turning to FIG. 3a, FIG. 3a discloses a system 300 including novel PSE 310 and PD 320, according to an embodiment of the present invention. PSE 310 contains a design which offers compatibility with conventional PDs but may also include special features which allow it to be readily distinguishable from a conventional PSE, on the physical layer, by a PD of the present invention, for example PD 320, thus allowing activation of modes of operation including features only compatible with novel PD 320, according to an embodiment of the present invention. PD 320 may be compatible with conventional, IEEE-compliant PSEs, but also includes special features which allow it to be readily distinguishable from a conventional PD, on the physical layer, by a PSE of the present invention, for example PSE 310, thus allowing activation of modes of operation including features only compatible with a novel PD 320, according to an embodiment of the present invention. Thus, PSE 310 and PD 320 do not require conventional power up and communication with a connected device in order to identify such a device as being compatible with a new set of protocols or features of the present invention.

As previously stated, according to the IEEE standard, a PSE is prohibited from applying power to an Ethernet connected PD in a reverse polarity of Alternative B, that is, with positive polarity applied to a second spare pair 138, comprising Ethernet pins 7,8, and a negative polarity applied to a first spare pair 136, comprising Ethernet pins 4,5. Thus, a novel PSE 310 of one embodiment of the present invention takes advantage of this restriction on conventional PSEs and applies a reverse polarity of Alternative B as described above. As can be seen in FIG. 3a, PSE 310 may include a first current source 312 and second current source 314. First current source 312 may be connected to first and second data pairs 132,134, comprising conductors 1, 2 and 3, 6 respectively, of Ethernet connected PD 320. This step may further be disclosed as step 410 of flowchart 400 in FIG. 4. Although not shown in FIG. 3a, PSE 310 may be capable of also applying first current source 312 in a polarity opposite of that shown. PSE 310 also includes second current source 314, which is connected such that a negative polarity is connected to a first spare pair 136 of Ethernet cable 130, comprising conductors 4, 5, and a positive polarity is connected to a second spare pair 138, comprising conductors 7, 8. This step may be further disclosed as step 420 of flowchart 400 in FIG. 4. First and second current sources 312,314 may be configured to apply a detection current of 0.2 mA, for example, to an attached PD in order to identify the configuration of the attached PD.

According to FIG. 3a, novel PD 320 may include a first full-wave rectifier 322 and second full-wave rectifier 324 each having first and second input terminals, a rectified positive rail and a rectified negative rail. As can be seen, Ethernet inputs may be connected such that first data pair 132, comprising conductors 1, 2, is connected to a first input terminal of first full-wave rectifier 322 and second data pair 134, comprising conductors 3, 6, is connected to the second input terminal of first full-wave rectifier 322. Further, first spare pair 136, comprising conductors 4, 5, may be connected to the first input terminal of second full-wave rectifier 324 and second spare pair 138, comprising conductors 7, 8, may be connected to the second input terminals of second full-wave recitifier 324. PD 320 further contains a first signature detection resistor R1 having first terminal connected to the rectified positive rail of both first and second full-wave rectifiers 322, 324 and a second terminal connected to the rectified negative rail of both first and second full-wave rectifiers 322,324. However, in order to avoid the shortfalls of conventional PD design, PD 320 may further include a second signature resistor R2 which allows PD 320 to detect when a reverse Alternative B polarity is applied to its first and second spare pair inputs 136,138, as is done exclusively by novel PSE 310. Thus, R2 has a first terminal connected to the rectified positive rail of both first and second full-wave rectifiers 322,324, just as first signature detection resistor R1, however the second terminal of R2 is connected to the first spare pair input 136, comprising conductors 4, 5. Thus, the R2 in effect allows an extraction of a half-wave rectification from the second full-wave rectifier 324. Both R1 and R2 may have a value of 25 k$\Omega$, according to IEEE 802.3-at specifications.

Thus, PSE 310 may now simultaneously apply a detection pulse from first and second current sources 312,314 to PD 320 and simultaneously measure a first voltage across first current source 312 and a second voltage across second current source 314 during the detection pulses. This step may be further disclosed as step 430 of flowchart 400 in FIG. 4.

The operation of PD 320 during the simultaneous detection pulses will now be discussed with reference to FIGS. 3a, 3b, and 4. When a detection pulse is applied via first and second current sources 312,314 of PSE 310, a current of, for example, 0.2 mA will flow into each of first and second full-wave rectifiers 322,324 and out of the rectified positive rail of each of first and second full-wave recitifiers 322,324. 0.2 mA will flow through R1 causing 0.1 mA to flow back to the rectified negative rail of the second full-wave rectifier 324 and return to the negative polarity of second current source 314 via first spare pair 136, and conductors 4, 5, and 0.1 mA to flow back to the rectified negative rail of the first full-wave rectifier 322 and return to the negative polarity of first current source 312 via second data pair 134, and conductors 3, 6. Because 0.2 mA flows through R1, a voltage drop of 5V will be induced across R1. Thus, a voltage at the first terminal of R2 will also be 5V and a 0.2 mA current will also flow through R2, bypass first and second full-wave rectifiers 322,324 and return to PSE 310 via first spare pair 136, comprising conductors 4, 5. During the simultaneous detection pulses, the voltage at the first and second terminals of R2 may be measured by PD 320. This step may be further disclosed by step 460 of flowchart 400 in FIG. 4. In this case, neglecting diode voltage drops, the voltage at the first terminal of R2 would be VA=5V and the voltage at the second terminal of R2 would be VB=0V. These two voltages may then be used by PD 320 to determine the configuration of a connected PSE, as disclosed in step 470 of flowchart 400 in FIG. 4, to determine whether a connected PSE is a novel PSE of the present invention, having capability to utilize special or advanced features in its operation.

As disclosed by step 440 of flowchart 400 in FIG. 4, the application of current via first current source 312 is then discontinued by disconnecting first current source 312 and then applying another detection pulse via second current source 314. A circuit representative of such a step is shown in FIG. 3b. It should be understood that the circuit of FIG. 3b is the same as the circuit of FIG. 3a except that first current source 312 is disconnected from PD 320. Thus, common numerals between FIGS. 3a and 3b represent the same elements.

When a detection pulse is applied via second current source 314 of PSE 310, a current, of, for example, 0.2 mA will flow into second full-wave rectifier 324 and out of the rectified positive rail of second full-wave recitifier 324. 0.1 mA will flow through each of R1 and R2 causing 0.1 mA to flow back to the rectified negative rail of the second full-wave rectifier 324 and 0.1 mA to flow back directly to the first spare pair 136, bypassing second full-wave rectifier 324. Thus, 0.2 mA will collectively return to the negative polarity of second current source 314 via first spare pair 136 and conductors 4, 5. Because 0.1 mA flows through each of R1 and R2, a voltage of 2.5V will be induced across R1 and across R2. Thus, a voltage at the first terminal of R2 will also be VA=2.5V and a voltage at the second terminal of R2 will be VB=0V. These voltages at the first and second terminals of R2 may be measured by PD 320, as disclosed by step 460 of flowchart 400 in FIG. 4. These two voltages may then be used by PD 320 to determine the configuration of a connected PSE, as disclosed in step 470 of flowchart 400 in FIG. 4, to determine whether a connected PSE is a PSE of the present invention, having capability to utilize special or advanced features in operation. It is at this point that a third voltage, across second current source 314, may also be measured by PSE 310. In this case, this voltage would be V3=2.5V. Thus, the first and second voltages, measured across first and second current sources 312,314 respectively, and the third voltage, measured across second current source 314, may be used by PSE 310 to determine the configuration of a connected PD 320, as disclosed in step 450 of flowchart 400 in FIG. 4, to determine whether a connected PD is a PD of the present invention, having capability to utilize special or advanced features in operation. If a connected PD is determined by PSE 310 to be a PD of the present invention, for example PD 310, additional special or advanced features may be activated in both PSE 310 and PD 320.

Thus, where a PD according to an embodiment of the present invention is involved, the PD may distinguish between a conventional PSE and a PSE according to an embodiment of the present invention, based on the voltages at two nodes being monitored by PD 320. Similarly, PSE 310 can distinguish between a conventional PD and a PD, according to an embodiment of the present invention, based on simultaneous voltage detection across the data and spare pairs and subsequent voltage detection across only the spare pairs, by PSE 310.

In addition to being able to detect a connected device which supports additional special or advanced features, PSE 310 and PD 320 must also be backward compatible with conventional PDs and PSEs, respectively. FIGS. 5a-8c disclose various combinations of conventional devices connected to either a PSE or PD according to an embodiment of the present invention to demonstrate that PSE 310 and PD 320 of the present invention also accomplish this requirement of backward compatibility.

FIGS. 5a-5d each disclose a System 500 including a conventional 30-watt (2-pair) PSE 510 from which power may be supplied to a PD 520 according to the present invention, according to either Alternative A MDI, Alternative A MDI-X, or Alternative B, as disclosed previously. It should be understood that PD 520 contains the same circuit as PD 320, disclosed in FIGS. 3a and 3b. Thus, all numerals and elements within PD 520 may correspond to similar numerals and elements within PD 320.

Figure 5A:
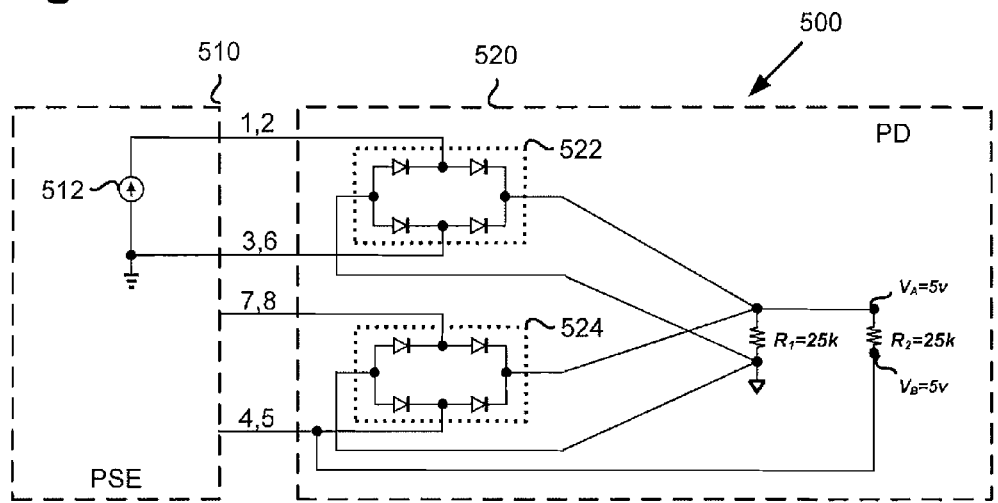
FIGS. 5a-5d present circuit diagrams of a conventional IEEE-compatible 30-watt (2-pair) power sourcing equipment device (PSE) connected to a novel powered device (PD) utilizing a detection protocol for detecting a configuration of a device connected via Ethernet connection, according to one embodiment of the present invention.

FIG. 5a discloses a circuit wherein conventional 30-watt (2-pair) PSE 510 is connected to PD 520 according to Alternative A MDI. A first current source 512 is connected across first and second data pairs 132,134 such that a positive polarity is present on the first data pair 132, comprising conductors 1, 2. Thus, the negative polarity of first current source 512 is present on second data pair 134 comprising conductors 3, 6. When a detection pulse is applied via first current source 512 of PSE 510, a current of, for example, 0.2 mA will flow into first full-wave rectifier 522 and out of the rectified positive rail of first full-wave recitifier 522. Because there is no return path to first current source 512 through either of first or second spare pairs 136,138 comprising conductors 4, 5 and 7, 8, respectively, all 0.2 mA will flow through R1 to the rectified negative rail of the first full-wave rectifier 522, causing a voltage drop of 5V across R1. Because no current flows through R2, there will not be a voltage drop across R2. Thus, a voltage at the first terminal of R2 will be VA=5V and a voltage at the second terminal of R2 will also be VB=5V. It is important to note that any conventional IEEE 802.3-at compliant PSE, prohibited from being connected to a PD in a reverse-polarity to Alternative B, connected to PD 520, will induce a voltage across R2 which is the same on both first and second terminals of R2 specifically due to the circuit arrangement of novel PD 520 disallowing a current to flow through R2. Because there is a voltage of, for example, 5V at both terminals of R2, PD 520 may see that only R1 is getting the detection current pulses and may therefore conclude that there is an IEEE-compliant PSE connected to it and may therefore restrict itself to IEEE 802.3 at compliant behavior. The conventional PSE 510 would sense only signature resistor R1, having a value of, for example, 25 kΩ and commence with startup of a powerup sequence.

Figure 5B:
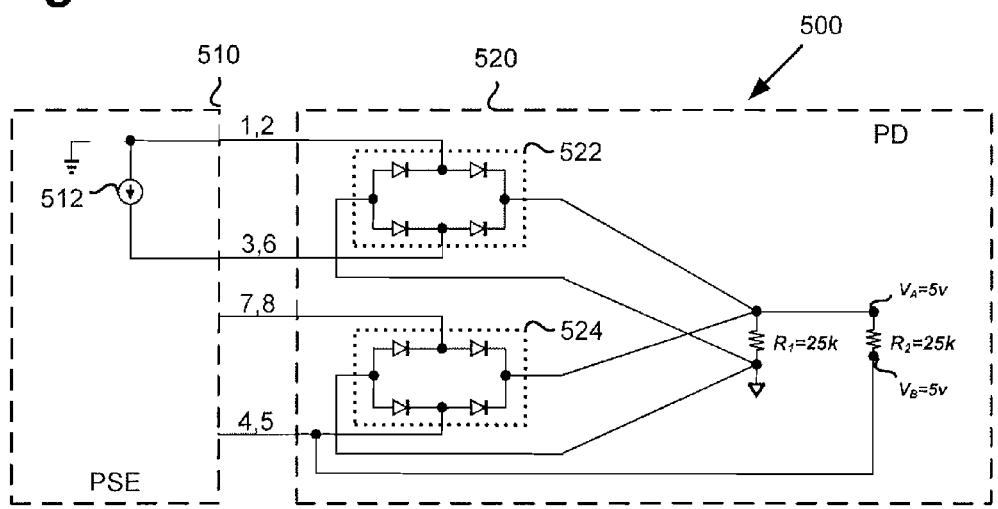

FIG. 5b discloses the same PSE 510 connected to PD 520, but now according to Alternative A MDI-X, such that a positive polarity is present on the second data pair 134, comprising conductors 3, 6 and the negative polarity of first current source 512 is present on first data pair 132, comprising conductors 1, 2. When a detection pulse is applied via first current source 512 of PSE 510, a current of, for example, 0.2 mA will flow into first full-wave rectifier 522 in the reverse direction as in FIG. 5a. However, because of the operation of first full-wave rectifier 522, all currents through and voltages across signature resistors R1 and R2 will be the same as in FIG. 5a. Thus, PD 520 may conclude that there is an IEEE-compliant PDE connected to it and may therefore restrict itself to IEEE 802.3at compliant behavior. The conventional PSE 510 would sense only signature resistor R1 having a value of, for example, 25 kΩ and commence with startup of a powerup sequence.

Figure 5C:
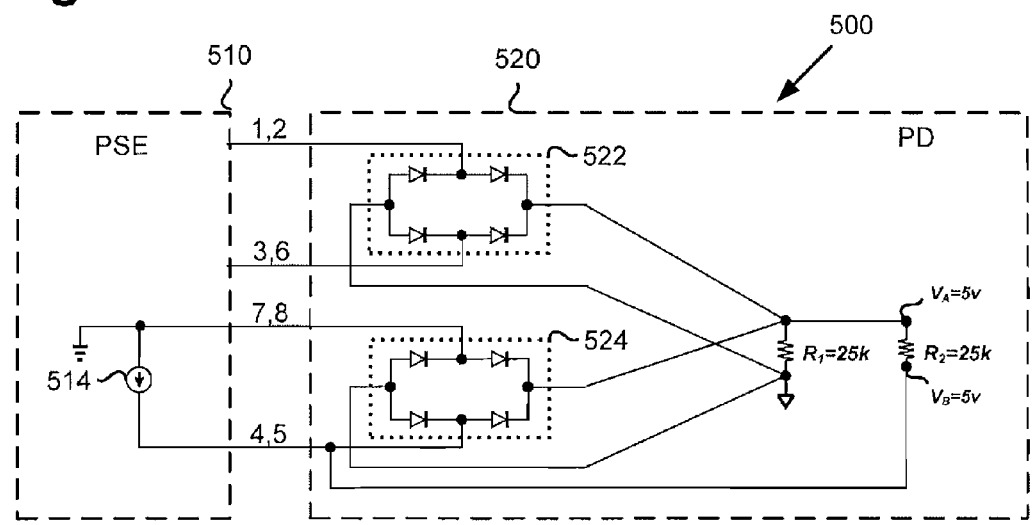

FIG. 5c discloses the same PSE 510 connected to PD 520, but now according to Alternative B, such that a positive polarity of second current source 514 is present on the first spare pair 136, comprising conductors 4, 5, and the negative polarity of second current source 514 is present on second spare pair 138, comprising conductors 7, 8. When a detection pulse is applied via second current source 514 of PSE 510, a current of, for example. 0.2 mA will flow into second full-wave rectifier 524 and out of the rectified positive rail of second full-wave recitifier 524. Because the first terminal of R2 is connected to the positive polarity of second current source 514 via second full-wave rectifier 524 and the second terminal of R2 is connected to the positive polarity of second current source 514 via first spare pair 136 comprising conductors 4, 5, no current will flow through R2. Thus, all 0.2 mA will flow through R1 causing a voltage drop of 5V across R1. Thus, the voltage at both first and second terminals of R2 will be VA=VB=5V. Thus, PD 520 may conclude that there is an IEEE-compliant PSE connected to it and may therefore restrict itself to IEEE 802.3at-compliant behavior. The conventional PSE 510 would sense only signature resistor R1, having a value of, for example, 25 kΩ and commence with startup of a powerup sequence.

Figure 5D:
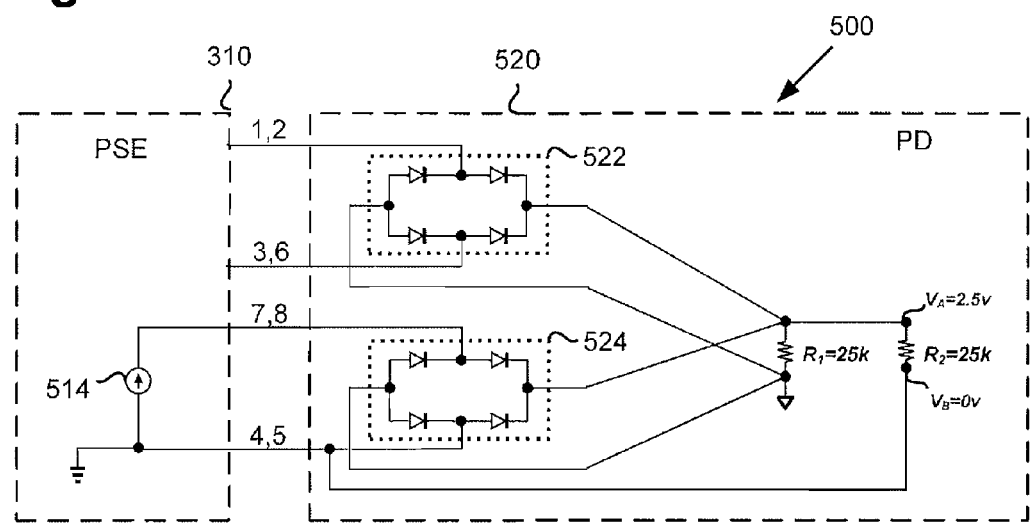

FIG. 5d discloses the same PSE 510 connected to PD 520 according to a prohibited reverse polarity of Alternative B, such that a positive polarity of second current source 514 is present on the second spare pair 138, comprising conductors 7, 8, and the negative polarity of second current source 514 is present on first spare pair 136, comprising conductors 4, 5. All measurable currents would flow in PD 520 exactly as described for PD 320 of FIG. 3b. Thus, the voltage across second current source 514 would be 2.5V, the voltage at first terminal of R2 would be VA=2.5V and the voltage at second terminal of R2 would be VB=0V. In this case, PD 520 would incorrectly conclude that PSE 510 was a PSE according to an embodiment of the present invention, however, because current flows equally through both R1 and R2 in this scenario, PSE 510 would sense both R1 and R2 in parallel with each other, an equivalent resistance of only 12.5 kΩ. According to the IEEE 802.3-at standard, a sensed signature resistance of less than 15 kΩ requires that PSE 510 not power up. Thus, this result is acceptable because the IEEE-compliant PSE 510 prevents a power up in this situation. Thus, a PD 520 according to an embodiment of the present invention is backward-compatible with IEEE-compliant 30-watt (2-pair) PSEs.

Figure 2:
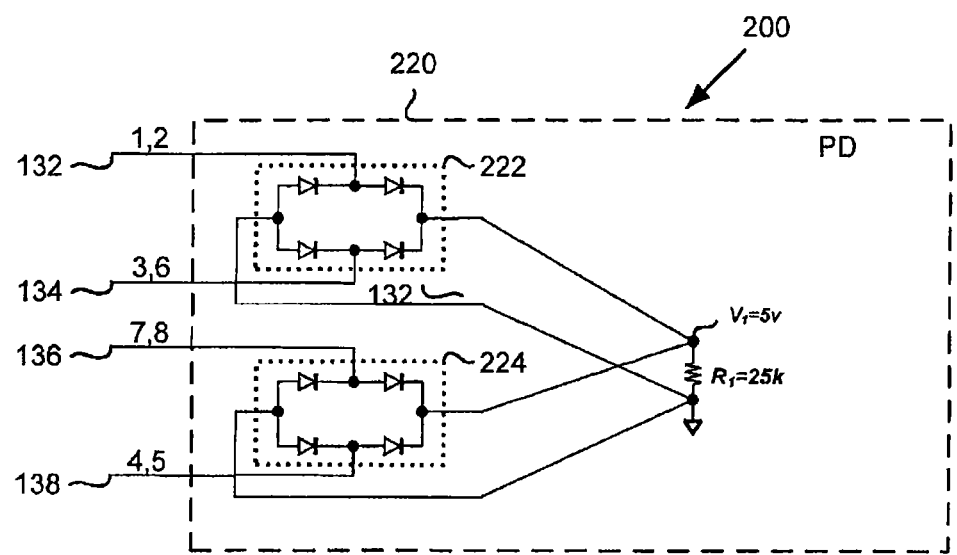
FIG. 2 presents a circuit diagram of a conventional powered device (PD) as used in a Power over Ethernet (PoE) system.
Figure 6A:
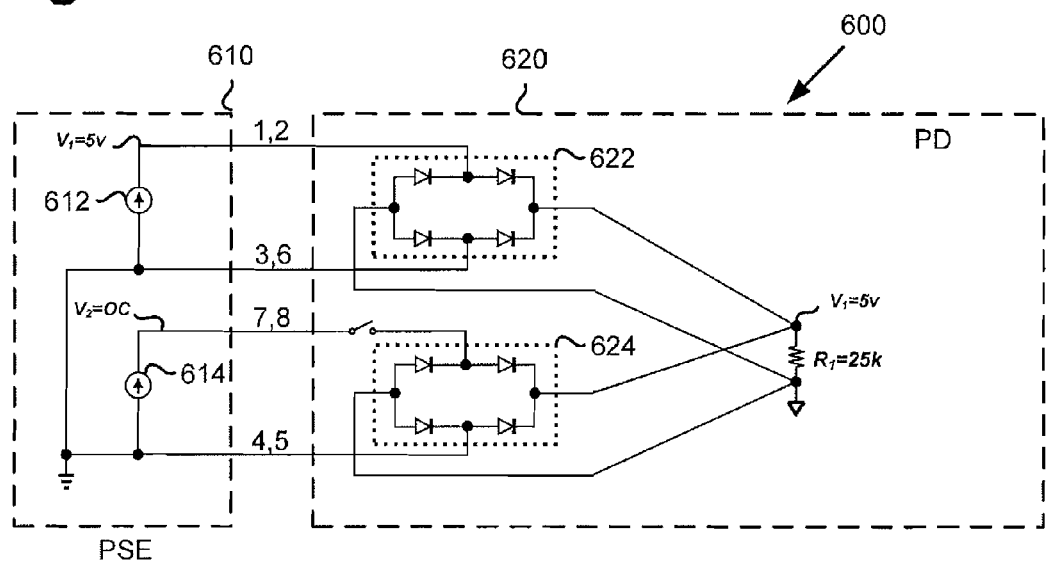
FIGS. 6a-6b present circuit diagrams of a novel PSE, according to an embodiment of the present invention, connected to a conventional IEEE compatible 30-watt (2-pair) PD, the novel PSE utilizing a detection protocol for detecting a configuration of a device connected via Ethernet connection, according to one embodiment of the present invention.
Figure 6B:
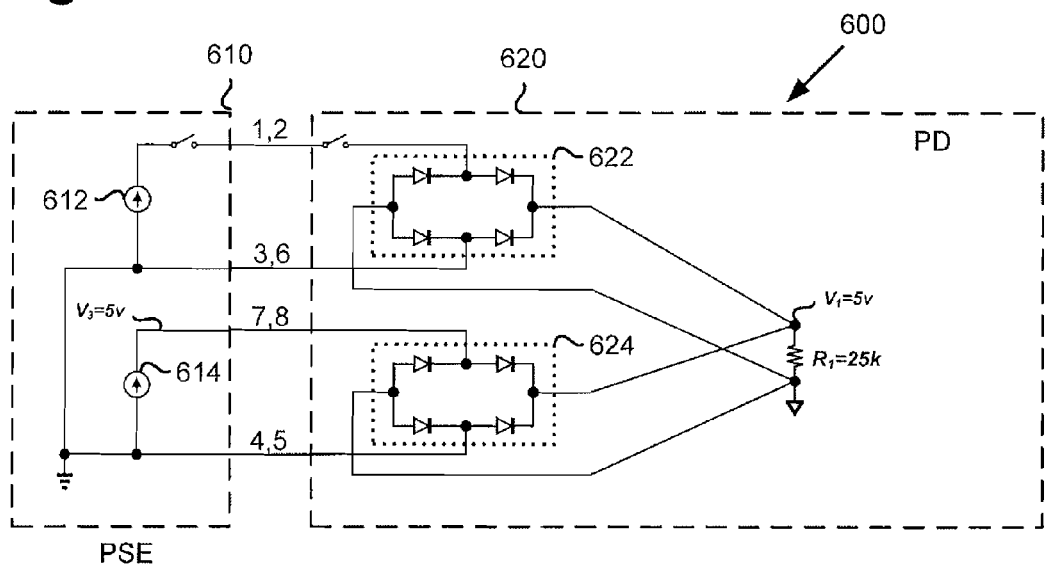

FIGS. 6a-6b disclose a System 600 including PSE 610, according to an embodiment of the present invention, from which power may be supplied to a conventional IEEE-compliant 30-watt (2-pair) PD 620. It should be understood that PSE 610 contains the same circuit as PSE 310, disclosed in FIGS. 3a and 3b. Thus, all numerals and elements within PSE 610 correspond to similar numerals and elements within PSE 310. Moreover, it should be understood that PD 620 contains substantially the same circuit as PD 220, depicted in FIG. 2. Thus, all numerals and elements within PD 620 correspond to similar numerals and elements within PD 220.

In FIG. 6a, a PSE 610, according to an embodiment of the present invention, simultaneously applies a detection pulse from first and second current sources 612,614 to PD 620 and simultaneously measures a first voltage across first current source 612 and a second voltage across second current source 614 during the detection pulses, as previously described regarding FIG. 3a and step 430 of FIG. 4. When simultaneous detection pulses are applied from PSE 610, first current source 612 will allow 0.2 mA of current to flow into first full-wave rectifier 622 via first data pair 132, comprising conductors 1, 2, out through the positive rectified positive rail of full-wave rectifier 622, through R1, and back to first current source 612 via rectified negative rail and second data pair 134, comprising conductors 3, 6. Thus, PSE 610 will measure a voltage across first current source 612 of V1=5V. However, because PD 620 is an IEEE-compliant 30-watt (2-pair) PD, due to PD design requirements, PSE 610 will read an open circuit across second current source 614.

In FIG. 6b, PSE 610 discontinues application of first current source 612 and measures the voltage across second current source 614 during a detection pulse, according to step 440 of FIG. 4. PSE 610 may allow 0.2 mA of current to flow into second full-wave rectifier 624 via second spare pair 138, comprising conductors 7, 8, out through the positive rectified positive rail of second full-wave rectifier 622, through R1 and back to second current source 614 via rectified negative rail and first spare pair 136, comprising conductors 4, 5. Thus, PSE 610 will measure a voltage across second current source 614 of V3=5V, according to step 440 of FIG. 4. Thus, PSE 610 will deduce that it is connected to an IEEE 802.3-at compliant 30-watt (2-pair) PD 620 and thus restrict itself to IEEE 802.3at compliant 30-watt (2-pair) behavior. Thus, a PSE 610, according to an embodiment of the present invention, is backward-compatible with IEEE-compliant 30-watt (2-pair) PDs.

Figure 7A:
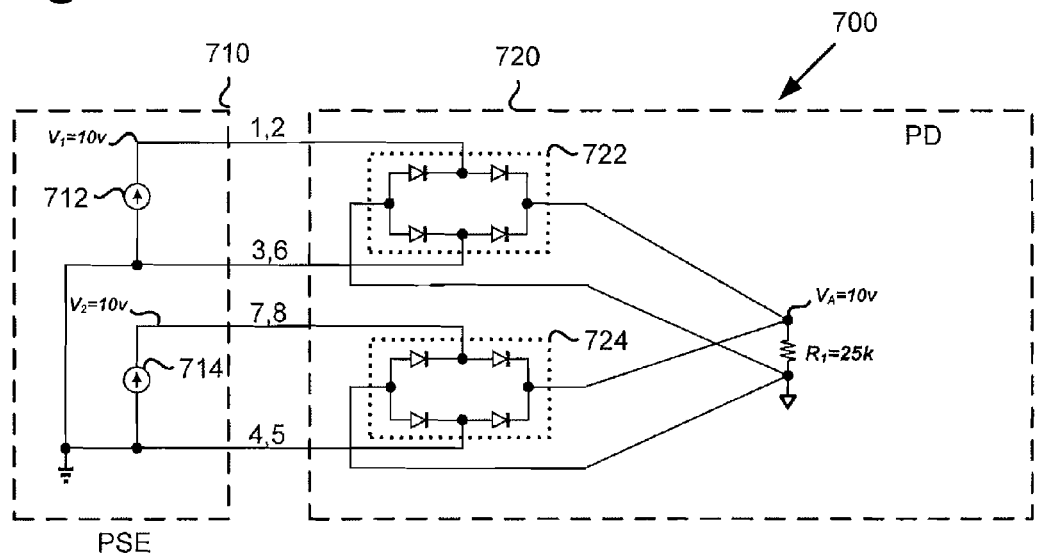
FIGS. 7a-7b present circuit diagrams of a novel PSE connected to a conventional IEEE compatible 60-watt (4-pair) PD, the novel PSE utilizing a detection protocol for detecting a configuration of a device connected via Ethernet connection, according to one embodiment of the present invention.
Figure 7B:
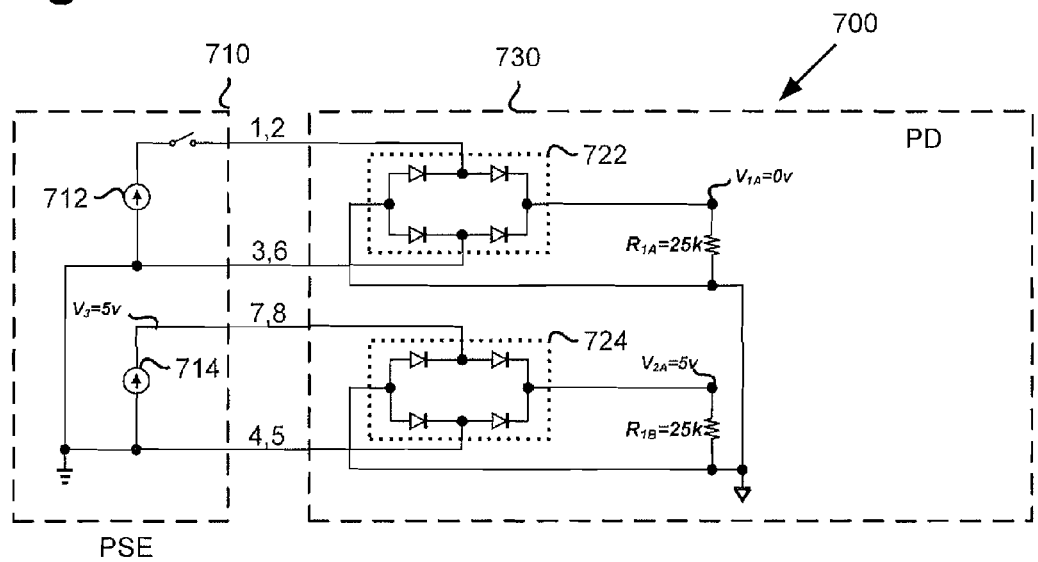

FIGS. 7a-7b disclose a System 700 including PSE 710, according to an embodiment of the present invention, from which power may be supplied to a conventional IEEE-compliant 60-watt (4-pair) PD 720. It should be understood that PSE 710 contains the same circuit as PD 310, depicted in FIGS. 3a-b. Thus, all numerals and elements within PSE 710 correspond to similar numerals and elements within PSE 310. Moreover, it should be understood that PD 720 of FIG. 7a contains substantially the same circuit as PD 220, depicted in FIG. 2. Thus, all numerals and elements within PD 720 of FIG. 7a correspond to similar numerals and elements within PD 220.

In FIG. 7a, a PSE 710, according to an embodiment of the present invention, simultaneously applies a detection pulse from first and second current sources 712,714 to PD 720 and simultaneously measures a first voltage across first current source 712 and a second voltage across second current source 714 during the detection pulses, as previously described regarding FIG. 3a and steps 410, 420 and 420 of FIG. 4. When simultaneous detection pulses are applied from PSE 710, first current source 712 will allow 0.2 mA of current to flow into first full-wave rectifier 722 via first data pair 132, comprising conductors 1, 2, out through the rectified positive rail of full-wave rectifier 722, through R1 and back to first current source 712 via rectified negative rail and second data pair 134, comprising conductors 3, 6. Second current source 714 will allow 0.2 mA of current to flow into second full-wave rectifier 724 via second spare pair 138, comprising conductors 7, 8, out through the rectified positive rail of second full-wave rectifier 724, through R1 and back to second current source 714 via rectified negative rail and first spare pair 136, comprising conductors 4, 5. Thus, because 0.2 mA from first current source 712 and 0.2 mA from second current source 714 flow through R1 a voltage drop across R1 of 10V will appear. Thus, PSE 710 will measure a first and second voltage across first and second current sources 712,714 of V1=V2=10V. Due to this measured voltage drop, PSE 710 will think it sees a 50 kΩ signature resistor within PD 720. In such a case, IEEE 802.3-at compliant PD 720 will communicate to PSE 710 via link layer discovery protocol (LLPD) identifying itself as a standard 60 W PD and PSE 710 will operate as a standard 60-watt PSE.

Figure 3B:
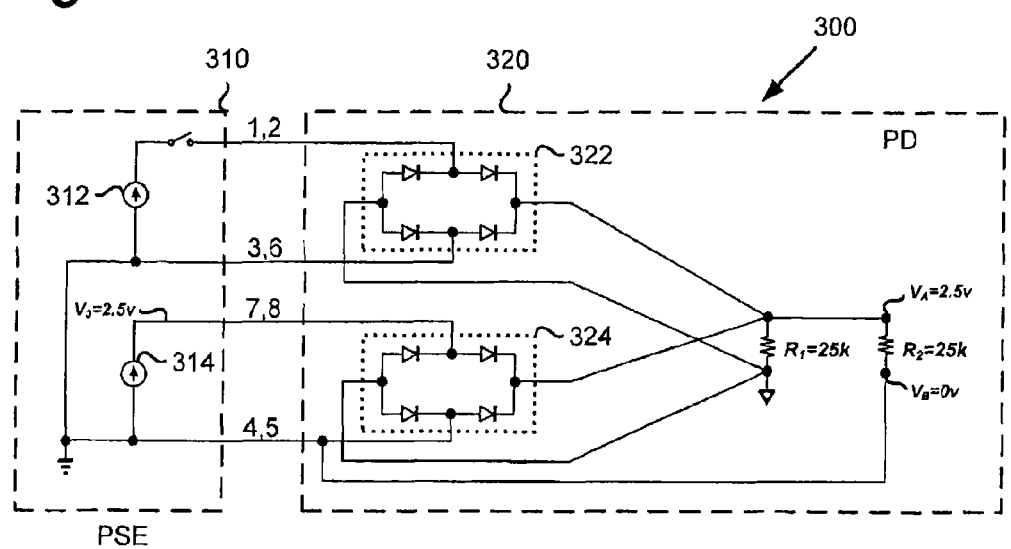

In FIG. 7b, PSE 710 applies a detection pulse from second current source 714 to conventional IEEE-compliant, current balanced 60-watt (4-pair) PD 730 and measures a third voltage across second current source 714 during the detection pulse, as previously described regarding FIG. 3b and step 440 of FIG. 4. When spare pair detection pulses are applied from PSE 710, second current source 712 will allow 0.2 mA of current to flow into second full-wave rectifier 724 via second spare pair 138, comprising conductors 7, 8, out through the positive rectified positive rail of second full-wave rectifier 724, through R1B and back to second current source 714 via rectified negative rail and first spare pair 136, comprising conductors 4, 5. Because R1B is 25 kΩ and 0.2 mA pass through R1B, the voltage drop across R1B, and second current source 714, will be V3=5V. However, this measured voltage is twice as large as it would be if PD 730 were a PD according to an embodiment of the present invention, and thus PSE 710 "sees the difference", will designate PD 730 as a standard 60 W PD, and may operate as a standard 60-watt PSE. Thus, a PSE 710, according to an embodiment of the present invention, is backward-compatible with both current balanced and standard IEEE-compliant 60-watt (4-pair) PDs.

Figure 8A:
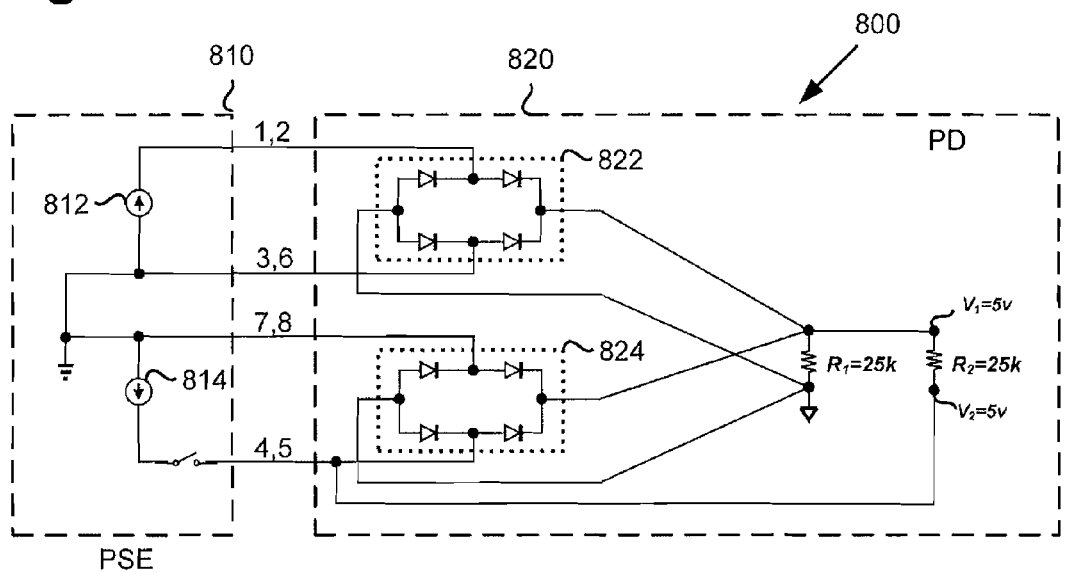
FIGS. 8a-8c present circuit diagrams of a conventional IEEE compatible 60-watt (4-pair) power sourcing equipment device (PSE) connected to a novel powered device (PD) utilizing a detection protocol for detecting a configuration of a device connected via Ethernet connection, according to one embodiment of the present invention.
Figure 8B:
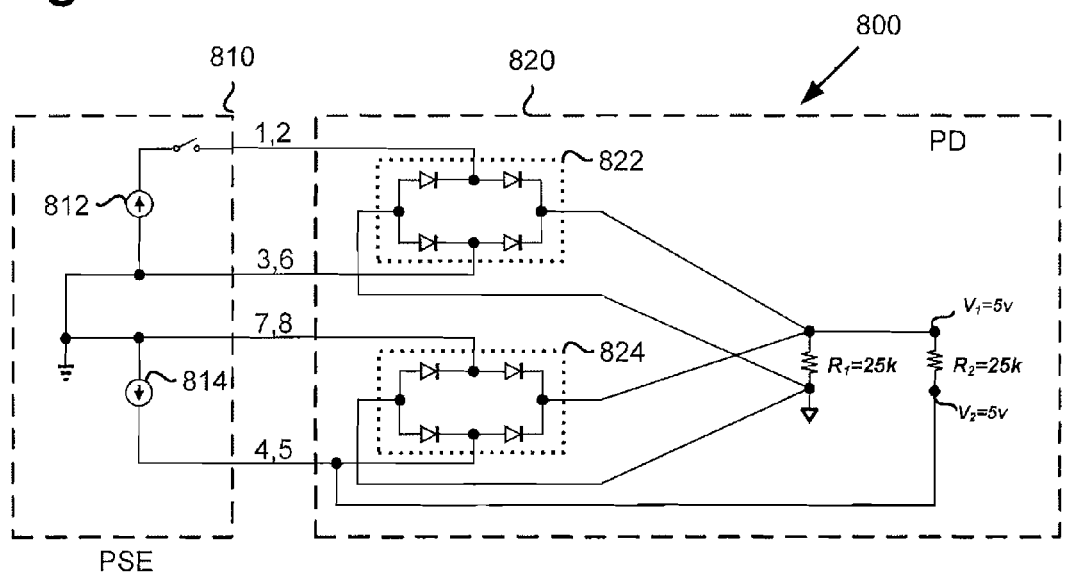
Figure 8C:
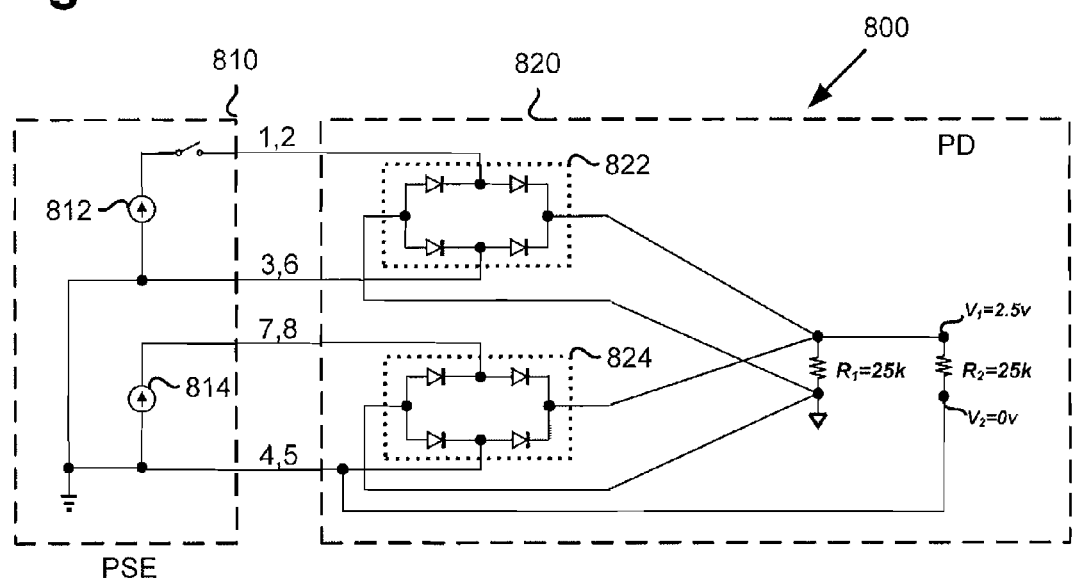

FIGS. 8a-8c disclose a System 800 including a conventional IEEE-compliant 60-watt (4-pair) PSE 810 from which power may be supplied to a PD 820, according to an embodiment of the present invention. It should be understood that PD 820 contains the same circuit as PD 320, depicted in FIGS. 3*a* and 3*b*. Thus, all numerals and elements within PD 820 correspond to similar numerals and elements within PD 320. Moreover, it should be understood that normal operation of the detection cycle of such a "conventional" 60-watt PSE includes applying detection pulses on data pairs 132,134, followed by detection pulses on the spare pairs 136,138, rather than simultaneous detection on both data and spare pairs, as in the present invention. Thus, FIG. 8*a* discloses a circuit wherein conventional 60-watt PSE 810 applies detection pulses to data pairs 132,134 and FIG. 8*b* discloses a circuit wherein conventional 60-watt PSE 810 applies detection pulses to spare pairs 136,138. A detection of a 25 kΩ signature resistor in both instances results in a conclusion that a 4-pair configuration is present in the connected PD and 4-pair power up commences.

In FIG. 8*a*, a first current source 812 is connected across first and second data pairs 132,134 such that a positive polarity is present on the first data pair 132, comprising conductors 1, 2. Thus, the negative polarity of first current source 812 is present on second data pair 134, comprising conductors 3, 6. A positive polarity of second current source 814 is present on the first spare pair 136 comprising conductors 4, 5 and the negative polarity of second current source 814 is present on second spare pair 138, comprising conductors 7, 8. However, second current source 814 is disconnected from PD 820. When a detection pulse is applied via first current source 812 of PSE 810 a current of, for example, 0.2 mA will flow in PD 820 exactly as described above in PD 520 of FIG. 5*a*. Thus, a voltage at the first terminal of R2 will be the same as the voltage at the second terminal of R2 such that VA=VB=5V. Therefore, PD 820 may conclude that there is an IEEE-compliant PSE connected to it and may restrict itself to IEEE 802.3at compliant behavior.

In FIG. 8*b*, first current source 812 is connected across first and second data pairs 132,134 such that a positive polarity is present on the first data pair 132, comprising conductors 1, 2, the negative polarity of first current source 812 present on second data pair 134, comprising conductors 3, 6. However, first current source 812 is disconnected from PD 820. A positive polarity of second current source 814 is present on the first spare pair 136 comprising conductors 4, 5 and the negative polarity of second current source 814 is present on second spare pair 138 comprising conductors 7, 8. When a detection pulse is applied via second current source 814 of PSE 810, a current of, for example, 0.2 mA will flow in PD 820 exactly as described above in PD 520 of FIG. 5*d*. Thus, a voltage at the first terminal of R2 will be the same as the voltage at the second terminal of R2 such that VA=VB=5V. Thus, PD 820 may conclude that there is an IEEE-compliant PSE connected to it and may therefore restrict itself to IEEE 802.3at-compliant behavior.

FIG. 8*c* discloses the same PSE 810 connected to PD 820 according to a prohibited reverse polarity of Alternative B, such that a positive polarity of second current source 814 is present on the second spare pair 138, comprising conductors 7, 8, and the negative polarity of second current source 814 is present on first spare pair 136, comprising conductors 4, 5. All measurable currents would flow in PD 820 exactly as described in FIG. 3*b*. Thus, the voltage across second current source 814 would be V3=2.5V, the voltage at first terminal of R2 would be VA=2.5V and the voltage at second terminal of R2 would be VB=0V. In this case, PD 820 would incorrectly conclude that PSE 810 was a PSE according to an embodiment of the present invention, however, because current flows equally through both R1 and R2 in this scenario, PSE 810 would sense both R1 and R2 in parallel with each other, an equivalent resistance of only 12.5 kΩ. According to the IEEE 802.3-at standard, a sensed resistance of less than 15 kΩ requires that PSE 810 not power up. Thus, this result is acceptable because the IEEE-compliant PSE 810 prevents a power up in this situation. Thus, a PD 820 according to an embodiment of the present invention is backward-compatible with IEEE-compliant 60-watt (4-pair) PSEs.

By using a simplified structure such as that shown in FIGS. 3*a* and 3*b*, embodiments of the present inventive concepts leverage inexpensive circuitry to enable very reliable detection of PSEs and PDs on the physical layer without requiring a hard power up. Thus, embodiments of the present inventive concepts provide an inexpensive and simple system and method of implementing detection protocols for reliable detection of PSEs and PDs on the physical layer without requiring a hard power up.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for detecting a PoE (power over Ethernet) device, the system comprising:
   a powered device (PD) configured to accept an Ethernet cable connection, the PD having:
      first and second full-wave rectifiers, each having first and second input terminals, a rectified positive rail and a rectified negative rail;
      a resistor having a first terminal connected to the rectified positive rails of the first and second full-wave rectifiers and a second terminal connected to the rectified negative rails of the first and second full-wave rectifiers; and
      another resistor having a first terminal connected to the rectified positive rails of both first and second full-wave rectifiers and a second terminal connected to an input terminal of the second full-wave rectifier.

2. The system of claim 1, further comprising first and second data pairs connected to the first and second input terminals of the first full-wave rectifier, respectively.

3. The system of claim 1, further comprising first and second spare pairs connected to the first and second input terminals of the second full-wave rectifier, respectively.

4. The system of claim 3, wherein the first spare pair corresponds to an Ethernet cable pinout consisting of pins 4 and 5 and the second spare pair corresponds to an Ethernet cable pinout consisting of pins 7 and 8.

5. The system of claim 1, wherein the resistor has a value of 25 kΩ.

6. The system of claim 1, wherein the another resistor has a value of 25 kΩ.

7. The system of claim 1, further comprising a power sourcing equipment device (PSE) connected to the PD via the Ethernet cable connection.

8. The system of claim 7, wherein the PSE is configured to simultaneously apply a first detection current to the PD via a first and second data pairs of the Ethernet connection and a second detection current to the PD via a first and second spare pairs of the Ethernet connection.

9. The system of claim 7, wherein the PSE and PD are compatible with IEEE 802.3 compatible PDs and PSEs, respectively.

10. A method for detecting a PoE (power over Ethernet) device, the method comprising:
applying a positive polarity of a first current source to one of a first and second data pairs of an Ethernet cable connection to a powered device (PD) and a negative polarity of the first current source to the other of the first and second data pairs;
applying a positive polarity of a second current source to a second spare pair of the Ethernet cable connection and a negative polarity of the first current source to a first spare pair of the Ethernet connection;
dropping a voltage with a resistor disposed between positive and negative rails of first and second full-wave rectifiers;
simultaneously measuring a first voltage across the first current source and a second voltage across the second current source;
dropping a voltage with a second resistor between the positive rail of the second full-wave rectifier and an input terminal of the second full-wave rectifier;
discontinuing application of the first current source and measuring a third voltage across the second current source; and
determining a configuration of the PD using the measured first, second and third voltages.

11. The method of claim 10, wherein the first spare pair corresponds to an Ethernet cable pinout consisting of pins 4 and 5 and the second spare pair corresponds to an Ethernet cable pinout consisting of pins 7 and 8.

12. The method of claim 10, further comprising activating additional device features in a power sourcing equipment device (PSE) connected to the PD when a desired configuration of the PD is determined.

13. The method of claim 10, wherein the first current source applies a current of 0.2 mA.

14. The method of claim 10, wherein the second current source applies a current of 0.2 mA.

15. The method of claim 10, wherein the configuration of the PD is determined to be one of an IEEE-compliant 30 watt 2-pair PD interface, an IEEE-compliant 60 watt 4-pair PD interface, or an advanced 60 watt 4-pair PD interface.

16. A method for detecting a configuration of a power supply equipment device (PSE) connected to a powered device (PD), the method comprising:
dropping a voltage with a first resistor connected between positive and negative rails of a second full-wave rectifier;
simultaneously measuring a first voltage at a first terminal of a second resistor and a second voltage at a second terminal of the second resistor, the second resistor disposed within the PD; and
determining the configuration of the PSE using the measured first and second voltages;
wherein the PD further comprises a first full-wave rectifier and the second full-wave rectifier, the first terminal of the second resistor connected to a rectified positive rail of the first and second full-wave rectifiers and the second terminal of the second resistor connected to a terminal corresponding to pins 4 and 5 of a spare pair Ethernet cable connection of the PD.

17. The method of claim 16, wherein determining the configuration of the PSE further comprises comparing the measured first voltage to the measured second voltage.

18. The method of claim 16, further comprising activating additional device features in the PD when a desired configuration of the PSE is determined.

19. The method of claim 16, wherein the configuration of the PSE is determined to be one of IEEE-compliant 30 watt 2-pair PSE interface, an IEEE-compliant 60 watt 4-pair PSE interface, or an advanced 60 watt 4-pair PSE interface.

* * * * *